United States Patent
Xu et al.

(10) Patent No.: US 7,919,569 B2
(45) Date of Patent: Apr. 5, 2011

(54) PROCESS FOR THE POLYMERIZAION OF OLEFINS

(75) Inventors: Wei Xu, Dhahran (SA); Vugar O. Aliyev, Riyadh (SA); Sirajudeen Mohamed, Riyadh (SA); Atieh Abu-Raqabah, Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 210 days.

(21) Appl. No.: 11/921,616

(22) PCT Filed: May 12, 2006

(86) PCT No.: PCT/CA2006/000757
§ 371 (c)(1),
(2), (4) Date: Mar. 13, 2009

(87) PCT Pub. No.: WO2006/130953
PCT Pub. Date: Dec. 14, 2006

(65) Prior Publication Data
US 2009/0203859 A1    Aug. 13, 2009

(30) Foreign Application Priority Data

Jun. 7, 2005   (EP) .................................... 05012188

(51) Int. Cl.
C08F 4/602 (2006.01)
C08F 4/609 (2006.01)
C08F 4/642 (2006.01)
C08F 4/649 (2006.01)
C08F 4/6592 (2006.01)

(52) U.S. Cl. ........ 526/163; 526/113; 526/116; 526/135; 526/136; 526/141; 526/142; 526/160; 526/165; 526/943; 502/103; 502/113; 502/114; 502/115; 502/152; 502/155; 502/156

(58) Field of Classification Search .................. 526/113, 526/116, 135, 136, 141, 142, 160, 165, 163, 526/943; 502/103, 113, 114, 115, 152, 155, 502/156
See application file for complete search history.

(56) References Cited

U.S. PATENT DOCUMENTS

| 5,026,795 | A | 6/1991 | Hogan |
| 5,332,706 | A | 7/1994 | Nowlin et al. |
| 5,410,002 | A | 4/1995 | Govoni et al. |
| 5,473,028 | A | 12/1995 | Nowlin et al. |
| 6,140,432 | A | 10/2000 | Agapiou et al. |
| 6,245,868 | B1 | 6/2001 | Agapiou et al. |
| 2004/0254316 | A1 | 12/2004 | Dickey et al. |

FOREIGN PATENT DOCUMENTS

| EP | 0453116 A1 | 10/1991 |
| EP | 0811638 A2 | 12/1997 |
| FR | 1316773 A | 2/1963 |
| WO | WO9611961 A1 | 4/1996 |
| WO | WO97/27228 | 7/1997 |
| WO | WO9746599 A1 | 12/1997 |

OTHER PUBLICATIONS

"Counterion Effects on Propylene Polymerization Using Two-State ansa-Metallocene Complexes", Muqtar et al., J. Am. Chem. Soc., vol. 125, No. 26, p. 7930-7941 (2003).
"Sterically Crowded Aryloxide Compounds of Aluminum", Healy et al., Organometallics, vol. 7, No. 12, p. 2543-2548 (1988).
Reactions of Trimethylaluminum or Trimethylgallium with Bulky Primary Amines: . . . , Waggoner et al., J. Am. Chem. Soc., vol. 113, No. 9, p. 3385-3393 (1991).
"Synthesis, Structure, and Characterization of [RAl(u-NHEt)(u-NEt)2Si(NHEt)]2 (R=Me, Et)", Kaskel et al., Eur. J. Inorg. Chem., p. 1193-1196 (2003).
"Exchange Reactions Between Dialkylzirconocene and Alkylaluminium Compounds", Siedle et al., Polyhedron, vol. 9, No. 2/3, p. 301-308 (1990).

Primary Examiner — Caixia Lu
(74) Attorney, Agent, or Firm — Jim D. Wheelington

(57) ABSTRACT

The present invention relates to a process for the polymerization of olefins, comprising the steps of introducing at least one olefin, at least one polymerization catalyst, at least one cocatalyst and at least one cocatalyst aid, and optionally a scavenger, into a polymerization reactor, and polymerizing the olefin, wherein the cocatalyst aid is a reaction product prepared separately prior to the introduction into the reactor by reacting at least one metal alkyl compound of group IIA or IIIA of the periodic system of elements and at least one compound (A) of the formula $R_mXR'_n$, wherein R is a branched, straight, or cyclic, substituted or unsubstituted, hydrocarbon group having 1 to 30 carbon atoms, R' is hydrogen or any functional group with at least one active hydrogen, X is at least one heteroatom selected from the group of O, N, P or S or a combination thereof, and wherein n and m are each at least 1 and are such that the formula has no net charge.

16 Claims, No Drawings

PROCESS FOR THE POLYMERIZAION OF OLEFINS

The present invention relates to a process for the polymerization of olefins and to the use of a cocatalyst aid in that process.

Polymerization processes to produce polymers for a wide variety of applications and products are well known in the art. In these processes any known polymerization catalyst systems may be utilized. Preferred are single-site catalyst containing systems, such as metallocenes or non-metallocene, and a more favorable system is a bimetallic catalyst system consisting of a metallocene and a Ziegler-Natta type catalyst.

It is also well known that these catalyst systems, especially single-site catalysts, have a tendency toward fouling and/or sheeting, particularly when they are supported on a carrier, and especially when they are used in a gas or slurry polymerization process. These single-site catalysts are very active and often result in the generation of extreme local heat to the growing polymer particle. Then a molten sheet may be formed in the reactor and it is difficult to remove it therefrom. Such fouling and/or sheeting in a continuous gas phase process can lead to the ineffective operation of various reactor systems such as the cooling system, temperature probes and the distributor plate. These upsets can lead to an early reactor shutdown.

Various methods for reduced tendencies for fouling of a single-site catalyst system have been discussed in the art. U.S. Pat. No. 5,283,218 is directed towards the prepolymerization of a metallocene catalyst. U.S. Pat. Nos. 5,332,706 and 5,473,028 disclosed to form a catalyst by "incipient impregnation". EP 0 453 116 A1 discloses the introduction of antistatic agents to the reactor for reducing the amount of sheets and agglomerates. WO 96/11961 discloses a supported catalyst system having an antistatic component for reducing fouling and sheeting in a gas, slurry or liquid pool polymerization process. Further, U.S. Pat. No. 5,026,795 discloses the addition of an antistatic agent with a liquid carrier to the polymerization zone in the reactor. U.S. Pat. No. 5,410,002 discusses using a conventional Ziegler-Natta titanium/magnesium supported catalyst system where a selection of antistatic agents is added directly to the reactor to reduce fouling. WO 97/46599 relates to the use of soluble metallocene catalysts that are fed into a lean zone in a polymerization reactor with antifoulants or antistatic agents, such as ATMER 163 (available from ICI Specialty Chemicals, Baltimore, Md.). EP 811 638 A2 discusses the use of a metallocene catalyst and an activating cocatalyst in a polymerization process in the presence of a nitrogen containing antistatic agent.

While all these possible solutions might reduce fouling or sheeting somewhat, some are expensive to employ and/or may not reduce both fouling and sheeting to a level sufficient for the successful operation of a continuous process, particularly in a commercial or large-scale process with supported single-site catalysts.

Many publications disclose various methods for introducing an antistatic agent. The most preferable method is to spray antistatic agent into the fluidized bed of the reactor. Another method generally discussed is the addition of an antistatic agent with the supported or liquid catalyst stream. The supported catalysts have to be slurried in mineral oil prior to being introduced to the reactor. However, the antistatic agent contains active protons which have several affects on the single-site catalysts. Thus, it would be advantageous to have a continuously operating polymerization process having more stable catalyst productivities and an easy method to introduce an agent which has the function to reduce fouling/sheeting tendencies without poisoning the activated single-site catalysts.

Aluminum alkyls are often used as scavengers for olefin polymerization. It is well known that an excess amount of scavenger, such as trimethylaluminum, will deactivate the single-site catalysts. It is desirable to have a reagent which has the functions of a scavenger with little effects on activated catalyst centers.

Amine or hydroxylated amines are well known antistatic agents. The co-injection of such agents with catalyst(s) will reduce or even eliminate the reactor fouling/sheeting. However, there are no effective methods to deliver enough antistatic agents to eliminate the sheeting of the reactor with no reverse effects on catalyst activity since the coordinative amine could also deactivate the active single-site catalysts by blocking the active catalytic centers.

It is therefore an object of the present invention to provide a process for the polymerization of olefins which overcomes the drawbacks of the prior art. Especially, a process shall be provided which prevents reactor fouling and/or sheeting and simultaneously provides a sufficient productivity of the catalytic system used.

The object is achieved by a process for the polymerization of olefins, comprising the steps of:
(i) introducing at least one olefin, at least one polymerization catalyst, and at least one cocatalyst aid, and optionally a scavenger, into a polymerization reactor, and
(ii) polymerizing the olefin,
wherein the cocatalyst aid is a reaction product prepared separately prior to the introduction into the reactor by reacting at least one metal alkyl compound of group IIA or IIIA of the periodic system of elements and at least one compound (A) of the formula $R_m XR'_n$, wherein R is a branched, straight, or cyclic, substituted or unsubstituted, hydrocarbon group having 1 to 50 carbon atoms, R' is hydrogen or any functional group with at least one active hydrogen, X is at least one heteroatom selected from the group of O, N, P or S or a combination thereof, and wherein n and m are each at least 1 and are such that the formula has no net charge,
wherein the ratio of the metal of the metal alkyl compound and X of compound (A) is about 1:2 to about 10:1

Preferably compound (A) is selected from amine derivatives, imine derivatives, phenol derivatives, alcohols or hydroxy group containing alkyl amines.

Most preferably compound (A) is an amine.

In one embodiment R is a hydrocarbon group having 10 to 40 carbon atoms.

In one embodiment R' is a functional group of the formula $-CH_2CH_2OH$.

It is preferred that the metal alkyl compound is an alkyl aluminum compound.

Moreover the polymerization catalyst may be a single site catalyst containing catalyst system.

Preferably the catalyst system is a metallocene containing catalyst system mixed with a Ziegler-Natta type catalyst.

In one embodiment the polymerization catalyst is supported on a support selected from inorganic oxide, magnesium chloride, clay, zeolite, polymeric support, graphite, or mixtures thereof.

Preferably the support is selected from the group consisting of silica, alumina, magnesia, titania, zirconia, polystyrene, polyethylene, polypropylene, polyvinylchloride, polycarbonate, polyketone, polyvinylalcohol, polymethylmethacrylate, cellulose, or mixtures thereof.

Further the polymerization catalyst is activated by at least one cocatalyst which may be selected from the group consisting of aluminum alkyls, aluminoxanes, boranes and/or borates.

It is preferred that the cocatalyst is methylaluminoxane (MAO), modified methylaluminoxane (MMAO), perfluorophenylborane, perfluorophenylborate, derivatives and/or mixtures thereof.

The process may be carried out in gas phase, slurry phase or solvent phase.

Additionally a modifier, a promoter and/or a electron donor reagent may be added into the reactor.

Preferably the modifier, promoter and/or electron donor reagent are selected from the group consisting of alcohol, titanate, ether, such as tetrahydrofurane, silicon containing compound, surfactant, antistatic reagent, antioxidant and/or fluorine containing compound.

Most preferred the ratio of the metal of the metal alkyl compound and X of compound (A) is from about 2:1 to about 4:1.

Preferably the scavenger is selected from the group of triisobutylaluminum, trihexylaluminum, triisopropylaluminum, triethylaluminum and/or trimethylaluminum.

Finally, a cocatalyst aid being a reaction product obtained by reacting at least one metal alkyl compound of group IIA or IIIA of the periodic system of elements and at least one compound (A) of the formula $R_mXR'_n$, wherein R is a branched straight, or cyclic, substituted or unsubstituted, hydrocarbon group having 1 to 30 carbon atoms, R' is hydrogen or any functional group with at least one active hydrogen, X is at least one heteroatom selected from the group of O, N, P or S or a combination thereof, and n and m are each at least 1 and are such that the formula has not net charge, may be used in a process for the polymerization of olefins.

It was surprisingly found that in the inventive process for the polymerization of olefins, a cocatalyst aid as defined above may be advantageously utilized which could be used as cocatalyst/scavenger as well as antifouling agent in that process.

The introduction of a conventional antistatic agent into a reactor reduces static build-up, reduces sheeting and eliminates hot spots. However, methods utilizing such conventional antistatic agents have negative impacts on catalyst productivity, particularly when highly active single-site catalyst systems are used. The benefits attributable to the cocatalyst aid used in the inventive process are not only reducing the reactor fouling/sheeting, but also decreasing the tendency of both aluminium alkyl and antistatic agent to poisoning the highly active single-site catalyst containing system. Therefore, the productivity of such catalyst systems may be dramatically increased.

In the present application, the term "cocatalyst aid" refers to a compound or a reagent which could help the cocatalyst to activate the polymerization catalyst or to prevent the deactivation of that catalyst, wherein the cocatalyst aid also prevents fouling and/or sheeting.

In the present invention, it is essential that the cocatalyst aid is prepared separately prior to being introduced into the polymerization reaction. Thus, the mere addition of an antistatic agent and a scavenger, separately into the polymerisation reactor, should be avoided. By using the reaction product of a scavenger and an antistatic agent, namely the cocatalyst aid in the inventive process, the problems with regard to scavenger capability as well as antistatic capability are overcome.

In a most preferred aspect of the present invention, the cocatalyst aid used is a reaction product of an aluminum alkyl and an amine. In that reaction, adducts ($R^1NH_2.AlR^2_3$), elimination products ($R^1NH$—$AlR^2_2$) and dimers ($R^1NH$—$AlR^2_2)_2$; $R^2_3Al.NH(R^1)$—$AlR^2_2$ may be possible products, wherein $R^1$ and $R^2$ are any hydrocarbon groups.

The process for the polymerization of olefins may be utilized to prepare homopolymers or copolymers of ethylene and alpha-olefins having about 3 to about 20 carbon atoms.

Examples of typical catalysts, especially single-site catalysts, which may be used in the process of the invention include but are not limited to:
1. Bridged or unbridged metallocenes
2. Mono-cyclopentadienyl containing complexes
3. Late transition metal containing complexes
4. Metal complexes with one or more of the following stabilizing ligands: Phosphinimine, cyclooctatetraendiyl, imides, phenoxy imines, amines and the like.

Ziegler-Natta type catalysts used in the inventive process may be any traditional Ziegler-Natta catalyst or modified Ziegler-Natta catalyst. Ziegler-Natta catalyst shall be a general term for coordination type catalysts before the discovery of metallocene or single site catalysts, having active metals such as Ti(IV), Ti(III), Cr, Zr, V, etc.

The polymers produced in the process of the present invention may be used in a wide variety of products and end use applications. Preferably, the polymers include homopolymers and copolymers of ethylene and other alpha-olefins. More preferably, bimodal (co)polymers, produced in a single reactor, are produced. However, also unimodal or multimodal (co)polymers may be obtained.

The polyolefins of the invention can be made into films, molded articles (including pipes), sheets, wire and cable coating and the like. The films produced may further contain additives, such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, talc, barium sulfate, diatomaceous earth, wax, carbon black, flame retarding additives, low molecular weight resins, hydrocarbon resins, glass beads and the like.

Further objects and advantageous of the present invention will become apparent for someone skilled in the art by the following detailed description of preferred examples of the inventive process. However, numerous variations are possible within the scope of the invention, and the scope of protection should not be limited to the examples.

In the examples, all materials were handled in a nitrogen atmosphere using either schlenk techniques or nitrogen filled glove box. Nitrogen and isopentane were supplied from a plant source and were dried through an additional bed of molecular sieves, if necessary. All other solvents were first dried over molecular sieves and, if necessary, sodium/potassium amalgam. The catalysts were prepared under temperature control in a silicon oil bath with stirring. Most reagents were used as received from the manufacturer or supplier. Materials were used as received by the manufacturer unless otherwise noted.

EXAMPLES

Cocatalyst Aid Preparation

Alkylaluminum, such as TIBAL (1M, heptane solution), triethylaluminum (TEAL) and trihexylaluminum (TnHAl), and an antistatic agent at the ratio as disclosed in Table 1 below were mixed to form a color solution in experiments A-F.

TABLE 1

Cocatalyst aid Preparations

| Exp. # | Aluminum Alkyls | Antistatic agent | Al/N |
|---|---|---|---|
| A | TIBAL (1M) | C18H37NH2 | 2 |
| B | TIBAL (1M) | C18H37NH2 | 4 |
| C | TIBAL (1M) | C18H37NH2 | 1 |
| D | TMA (2M) | C18H37NH2 | 2 |
| E | TEAL (1M) | C18H37NH2 | 2 |
| F | TnHAl (1M) | C18H37NH2 | 2 | stirred for 1 h at 50° C. All solvents were then removed by evacuation and the residue was washed with isopentane three times followed by drying under vacuum.

Polymerization Procedure

A supported catalyst, as prepared above, was used to obtain ethylene homopolymer. The polymerizations were carried out in a two-liter stirred autoclave, using deoxygenated isopentane as solvent. Hydrogen was added to control molecular weight, if desired, and a specific cocatalyst aid, as prepared above and disclosed in table 1, was added. Polymerizations were carried out at 88° C. and 20 bars of total pressure, wherein ethylene gas was supplied on demand to maintain the overall pressure at 20 bars. Upon completion of the polymerization, the reactor was vented and cooled to ambient temperature to recover the polymer obtained. Details of each polymerization and characteristics of the resins produced are provided in Table 2 below.

TABLE 2

Polymerizations with the cocatalyst aid

| Poly. No. | Cat. No. | Qty. (mg) | Cocat. Aid/ scavenger (mmol) | H2 (bar) | time (min.) | Yield (g) | Fouling Index* | Productivity (gPE/g-Cat · h) |
|---|---|---|---|---|---|---|---|---|
| C-1 | Ia | 25 | TIBAL (0.5) | 0 | 60 | 48 | 1 | 1920 |
| C-2 | Ia | 20 | TIBAL/Atmer 261 | 0 | 60 | 21 | 0 | 1050 |
| M-1 | Ia | 20 | TIBAL (0.25) | 0 | 60 | 30 | 1 | 1500 |
| M-2 | Ia | 20 | TIBAL (1) | 0 | 60 | 50 | 1 | 2500 |
| M-3 | Ia | 20 | C (1) | 0 | 60 | 5 | 0 | 250 |
| M-4 | Ia | 20 | B (1) | 0 | 60 | 90 | 0 | 4500 |
| M-5 | Ia | 20 | A (1) | 0 | 60 | 112 | 0 | 5600 |
| M-6 | Ia | 20 | A (1) | 0.1 | 60 | 50 | 0 | 2500 |
| M-7 | Ia | 20 | A (1) | 0.3 | 60 | 25 | 0 | 1250 |
| EP-1 | Ib | 20 | TIBAL (1) | 0 | 60 | 70 | 1 | 3000 |
| EP-2 | Ib | 20 | A (1) | 0 | 60 | 90 | 0 | 4500 |
| BM-1 | IIa | 20 | TIBAL (1) | 0 | 60 | 70 | 1 | 3000 |
| BM-2 | IIa | 20 | A (1) | 0 | 60 | 104 | 0 | 6240 |

Fouling index: 0 = no fouling; 1 = thin layer coating but can be removed easily; 2 = heavy fouling and it is difficult to remove the coatings.

Catalyst Preparation:

Supported Metallocene Catalyst on Silica:

To illustrate the preparation of a supported metallocene catalyst, 5 grams of ES70 silica which was calcinated at 600° C., 20 mL of a mixture of MAO (10% in toluene) and a specific amount of metallocene (Ia: (n-BuCp)$_2$ZrCl$_2$ or Ib: 2,2'-bis(2-indenyl)biphenylzirconiumdichloride) were mixed under a nitrogen atmosphere in a 100 mL round-bottom flask equipped with a stir bar. After stirring for an hour at 50° C., the solvents were then removed under vacuum.

Supported Bimetallic Catalyst:

Ziegler-Natta Catalyst

Under a dry nitrogen atmosphere, a Schlenk flask was charged with silica (Davison 955, 30.00 g), previously calcined at 600° C. for 4 hours, and dibutylmagnesium (1M, hexane, 30 mmol) in isopentane (100 ml) was added to the silica to form a slurry. The slurry was kept at 75° C. for 1 hour. Then, all solvents were removed under vacuum. t-BuCl (66 mmol, molar ratio Mg:Cl=1:2.2) was added to the above solid to form a slurry. The flask was kept at 75° C. for 1 hour. Finally, isopentane solution of TiCl$_4$ (5 mmol) and Ti(OEt)$_4$ (5 mmol) was added to form a slurry and the mixture was kept at 75° C. for 1 hour. Then, all solvents were removed under vacuum.

A mixture of 4 mL of MAO (10% in toluene) and a specific amount of metallocene (2,2'-bis(2-indenyl)biphenylzirconiumdichloride) at room temperature was added to 1 gram of Ziegler-Natta catalyst, prepared as above, and supported on silica to provide bimetallic catalyst Ia. The mixture was then As can be taken from table 2, the advantages of the inventive process are reducing or eliminating the poisoning effects of both the antistatic agent and aluminum alkyls while retaining scavenger functions of aluminum alkyl and antistating functions of antistatic agent in the cocatalyst aid.

As can be seen in table 2, examples C1, M1 and M2 are comparative examples, in that the catalyst was used with triisobutyl aluminium at different concentrations as scavenger only. Further, example C2 is a comparative example in that the catalyst was used with triisobutyl aluminium and Atmer (ethoxylated amine, commercially available from ICI Speciality Chemicals, Baltimore, Md.), which were separately added into the reactor.

If the antistatic agent is added separately, it will reduce the electrostatic properties. However, it will act as poison to the metallocene catalyst, table 2, comparison of examples C2 and M5.

However, if the aluminium alkyl is used alone in a polymerization process, without antistatic agent, it will function as a cocatalyst/scavenger. It will also attack the activated catalyst. However, utilizing the inventive process, it is prevented that the aluminium alkyl attacks the catalyst, table 2, examples M2 and M5.

As can be derived from table 2, adding only an aluminium alkyl as scavenger into a reactor for the polymerization of olefins, or adding separately an aluminium alkyl and an antistatic agent, will result in an inferior fouling index with decreased activities. However, utilizing a reaction product of an alkyl aluminium and an antistatic agent which is produced prior to introduction into the polymerization reactor, this reaction product shows an improved fouling index and high productivity.

Similar results may be obtained for copolymers of ethylene and alpha-olefin.

The features disclosed in the foregoing description and in the claims may, both separately and in any combination thereof, be material for realizing the invention in diverse forms thereof.

The invention claimed is:

1. A process for the polymerization of olefins, comprising the steps of:
   (i) introducing at least one olefin, at least one polymerization catalyst, and at least one cocatalyst aid, and optionally a scavenger, into a polymerization reactor, and
   (ii) polymerizing the olefin,
      wherein the cocatalyst aid is a reaction product prepared separately prior to the introduction into the reactor by reacting at least one metal alkyl compound of group IIA or IIIA of the periodic system of elements and at least one compound (A) of the formula $R_m XR'_n$, wherein R is a branched, straight, or cyclic, substituted or unsubstituted, hydrocarbon group having 1 to 50 carbon atoms, R' is hydrogen or any functional group with at least one active hydrogen, X is at least one heteroatom selected from the group consisting of O, N, P or S and a combination thereof, and wherein n and m are each at least 1 and are such that the formula has no net charge,
   wherein the ratio of the metal of the metal alkyl compound and X of compound (A) is from about 2:1 to about 4:1.

2. The process according to claim 1, wherein compound (A) is selected from the group consisting of amine derivatives, imine derivatives, phenol derivatives, alcohols and hydroxy group containing alkyl amines.

3. The process according to claim 2, wherein compound (A) is an amine.

4. The process according to claim 1, wherein R is a hydrocarbon group having 10 to 40 carbon atoms.

5. The process according to claim 1, wherein R' is a functional group of the formula —$CH_2CH_2OH$.

6. The process according to claim 1, wherein the metal alkyl compound is an alkyl aluminum compound.

7. The process according to claim 1, wherein the polymerization catalyst is a single site catalyst containing catalyst system.

8. The process according to claim 7, wherein the catalyst system is a metallocene containing catalyst system mixed with a Ziegler-Natta type catalyst.

9. The process according to claim 1, wherein the polymerization catalyst is supported on a support selected from the group consisting of inorganic oxide, magnesium chloride, clay, zeolite, polymeric support, graphite, and mixtures thereof.

10. The process according to claim 9, wherein the support is selected from the group consisting of silica, alumina, magnesia, titania, zirconia, polystyrene, polyethylene, polypropylene, polyvinylchloride, polycarbonate, polyketone, polyvinylalcohol, polymethylmethacrylate, cellulose, and mixtures thereof.

11. The process according to claim 1, wherein the polymerization catalyst is activated by at least one cocatalyst which is selected from the group consisting of aluminum alkyls, aluminoxanes, boranes and borates.

12. The process according to claim 11, wherein the cocatalyst is selected from the group consisting of methylaluminoxane (MAO), modified methylaluminoxane (MMAO), perfluorophenylborane, perfluorophenylborate, derivatives and mixtures thereof.

13. The process according to claim 1, wherein the process is carried out in gas phase, slurry phase or solvent phase.

14. The process according to claim 1 further comprising adding a modifier, a promoter and/or an electron donor reagent into the reactor.

15. The process according to claim 14, wherein the modifier, promoter and/or electron donor reagent are selected from the group consisting of alcohol, titanate, ether, silicon containing compound, surfactant, antistatic reagent, antioxidant and fluorine containing compound.

16. The process according to claim 1, wherein the scavenger is selected from the group of triisobutylaluminum, trihexylaluminum, triisopropylaluminum, triethylaluminum and trim ethyl aluminum.

* * * * *